US011101525B2

(12) United States Patent
Zhang et al.

(10) Patent No.: US 11,101,525 B2
(45) Date of Patent: Aug. 24, 2021

(54) LAMINATED MULTILAYER MEMBRANES, SEPARATORS, BATTERIES, AND METHODS

(71) Applicant: Celgard, LLC, Charlotte, NC (US)

(72) Inventors: Xiaomin Zhang, Charlotte, NC (US);
Eric Robert White, Fort Mill, SC (US); Kang Karen Xiao, Mississauga (CA); Robert A. Nark, Charlotte, NC (US); Insik Jeon, Tega Cay, SC (US); Kristoffer K. Stokes, Lunenburg, MA (US); Paul Vido, Rock Hill, SC (US); Zhengming Zhang, Rock Hill, SC (US)

(73) Assignee: Celgard, LLC, Charlotte, NC (US)

( * ) Notice: Subject to any disclaimer, the term of this patent is extended or adjusted under 35 U.S.C. 154(b) by 117 days.

(21) Appl. No.: 16/505,502

(22) Filed: Jul. 8, 2019

(65) Prior Publication Data

US 2019/0334151 A1   Oct. 31, 2019

Related U.S. Application Data

(62) Division of application No. 15/223,032, filed on Jul. 29, 2016, now Pat. No. 10,347,890.

(Continued)

(51) Int. Cl.

| | |
|---|---|
| *H01M 50/449* | (2021.01) |
| *H01M 50/44* | (2021.01) |
| *H01M 50/403* | (2021.01) |
| *H01M 50/411* | (2021.01) |
| *H01M 50/431* | (2021.01) |
| *H01M 50/446* | (2021.01) |
| *H01M 50/581* | (2021.01) |
| *H01M 10/42* | (2006.01) |
| *H01M 10/052* | (2010.01) |
| *B32B 5/16* | (2006.01) |
| *B32B 27/32* | (2006.01) |
| *B32B 3/26* | (2006.01) |
| *B32B 38/00* | (2006.01) |
| *B29K 105/04* | (2006.01) |

(52) U.S. Cl.
CPC ............. *H01M 50/449* (2021.01); *B32B 3/26* (2013.01); *B32B 5/16* (2013.01); *B32B 27/32* (2013.01); *H01M 10/4235* (2013.01); *H01M 50/403* (2021.01); *H01M 50/411* (2021.01); *H01M 50/431* (2021.01); *H01M 50/44* (2021.01); *H01M 50/446* (2021.01); *H01M 50/581* (2021.01); *B29K 2105/041* (2013.01); *B32B 2038/0028* (2013.01); *B32B 2250/03* (2013.01); *B32B 2255/10* (2013.01); *B32B 2255/20* (2013.01); *B32B 2255/26* (2013.01); *B32B 2264/00* (2013.01); *B32B 2270/00* (2013.01); *B32B 2305/026* (2013.01); *B32B 2307/30* (2013.01); *B32B 2307/50* (2013.01); *B32B 2307/516* (2013.01); *B32B 2307/54* (2013.01); *B32B 2307/582* (2013.01); *B32B 2307/5825* (2013.01); *B32B 2307/732* (2013.01); *B32B 2457/10* (2013.01); *H01M 10/052* (2013.01); *H01M 2200/10* (2013.01)

(58) Field of Classification Search
CPC ........... H01M 10/052; H01M 10/4235; H01M 2200/10; H01M 50/403; H01M 50/411; H01M 50/431; H01M 50/44; H01M 50/446; H01M 50/449; H01M 50/581
See application file for complete search history.

(56) References Cited

U.S. PATENT DOCUMENTS

| | | |
|---|---|---|
| 5,691,077 A | 11/1997 | Yu |
| 5,952,120 A | 9/1999 | Yu et al. |

(Continued)

FOREIGN PATENT DOCUMENTS

| | | |
|---|---|---|
| JP | H02504 | 1/1990 |
| JP | 002000340207 A1 | 12/2000 |

(Continued)

OTHER PUBLICATIONS

P. Arora and Z. Zhang. Battery Separators, Chem. Rev. 2004, 104, pp. 4419-4462.

(Continued)

*Primary Examiner* — Carlos Barcena
(74) *Attorney, Agent, or Firm* — Hammer & Associates, P.C.

(57) ABSTRACT

Disclosed herein are novel or improved microporous battery separator membranes, separators, batteries including such separators, methods of making such membranes, separators, and/or batteries, and/or methods of using such membranes, separators and/or batteries. Further disclosed are laminated multilayer polyolefin membranes with exterior layers comprising one or more polyethylenes, which exterior layers are designed to provide an exterior surface that has a low pin removal force. Further disclosed are battery separator membranes having increased electrolyte absorption capacity at the separator/electrode interface region, which may improve cycling. Further disclosed are battery separator membranes having improved adhesion to any number of coatings. Also described are battery separator membranes having a tunable thermal shutdown where the onset temperature of thermal shutdown may be raised or lowered and the rate of thermal shutdown may be changed or increased. Also disclosed are multilayer battery separator membranes having enhanced web handling performance during manufacturing processes and coating operations.

20 Claims, 4 Drawing Sheets

Related U.S. Application Data

(60) Provisional application No. 62/199,385, filed on Jul. 31, 2015.

(56) References Cited

U.S. PATENT DOCUMENTS

| | | |
|---|---|---|
| 6,080,507 A | 6/2000 | Yu |
| 6,432,586 B1 | 8/2002 | Zhang |
| 6,692,867 B2 | 2/2004 | Nark et al. |
| 8,486,556 B2 | 7/2013 | Call et al. |
| 8,932,748 B2 | 1/2015 | Kikuchi et al. |
| 9,843,030 B2 | 12/2017 | Miura |
| 2002/0136945 A1 | 9/2002 | Call |
| 2006/0166078 A1 | 7/2006 | Chen et al. |
| 2007/0148538 A1 | 6/2007 | Call |
| 2007/0207376 A1 | 9/2007 | Call et al. |
| 2008/0118827 A1 | 5/2008 | Call et al. |
| 2009/0098450 A1 | 4/2009 | Kikuchi et al. |
| 2009/0123827 A1 | 5/2009 | Kono et al. |
| 2014/0045033 A1 | 2/2014 | Zhang et al. |
| 2014/0079980 A1 | 3/2014 | Halmo et al. |
| 2016/0204409 A1 | 7/2016 | Jeon |

FOREIGN PATENT DOCUMENTS

| | | |
|---|---|---|
| JP | 002003297330 A1 | 10/2003 |
| JP | 2014028661 | 2/2004 |
| JP | 002005302634 A1 | 10/2005 |
| JP | 2010-510627 A1 | 4/2010 |
| WO | WO2013146585 | 10/2013 |

OTHER PUBLICATIONS

H. Lee, M. Yanilmaz, O. Toprakei, K. Fu, X. Zhang. A review of recent developments in membrane separators for rechargeable lithium-ion batteries, Energy Environ. Sci., Aug. 2014, DOI: 10.1039/c4ee01432d.
U.S. Appl. No. 14/982,466, filed Dec. 29, 2015, Jeon.
U.S. Appl. No. 62/097,199, filed Dec. 29, 2014, Jeon.
U.S. Appl. No. 62/099,636, filed Jan. 5, 2015, Jeon.
Japanese Office Action; from counterpart JP Application No. 2016-557978.

LAMINATED MULTILAYER MEMBRANES, SEPARATORS, BATTERIES, AND METHODS

CROSS REFERENCE TO RELATED APPLICATIONS

This application is a Divisional Application which claims priority to and the benefit of U.S. application Ser. No. 15/223,032, filed Jul. 29, 2016, which claims benefit to U.S. Provisional Patent Application Ser. No. 62/199,385 filed Jul. 31, 2015 hereby fully incorporated by reference herein.

FIELD OF THE INVENTION

In accordance with at least selected embodiments, the present application or invention is directed to novel or improved porous membranes, microporous membranes, battery separator membranes, multilayer membranes, laminated membranes, laminated multilayer membranes, separators, batteries or devices including such membranes or separators, methods of making such membranes, separators, devices, and/or batteries, and/or methods of using such membranes, separators, devices, and/or batteries. In accordance with at least certain embodiments, the present application is directed to a novel or improved microporous battery separator membranes, separators, batteries including such separators, methods of making such membranes, separators, and/or batteries, and/or methods of using such membranes, separators and/or batteries. In accordance with at least certain selected embodiments, the present invention is directed to a battery separator for a lithium battery that is a laminated multilayer microporous membrane having at least one polyethylene (PE) exterior layer or surface. In accordance with at least particular embodiments, the present invention is directed to a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer or multilayer configuration.

BACKGROUND OF THE INVENTION

A commonly known multilayer polyolefin separator membrane, which may be used in various lithium batteries, such as, for example, a lithium ion rechargeable battery, may include three layers of a polyolefin separator membrane configured, sometimes, as trilayer polypropylene/polyethylene/polypropylene (PP/PE/PP), where an inner polyethylene (PE) microporous membrane is sandwiched between two outer layers of polypropylene (PP) microporous membrane. Polypropylene, when used as a monolayer microporous separator membrane or when used as the outer layers in a multilayer microporous separator membrane may, in some instances, have a higher pin removal force than a polyethylene (PE) layer due to a higher surface coefficient of friction of the PP separator or outer layer.

U.S. Pat. No. 6,692,867 discloses the addition of a metallic stearate additive that may be added to a polypropylene resin in the production of a monolayer polypropylene microporous separator membrane or in the production of one or more outer polypropylene layers in a multilayer microporous separator membrane as a means to lower the pin removal force. One example of a metallic stearate may be calcium stearate. In some instances, calcium stearate may lower the pin removal force of a polypropylene microporous separator membrane when at least 50 parts per million is added to a polypropylene resin during the melt extrusion process to form the separator membrane.

The use of polypropylene as the outer layers in a multilayer (for example, trilayer) battery separator microporous membrane may, in some instances, be a preferred configuration. U.S. Patent Publication No. 2007/0148538 proposes various multilayer configurations, which may include "polypropylene/polyethylene/polypropylene" (PP/PE/PP) as a microporous shutdown trilayer separator membrane where the higher tensile strength, higher melt temperature polypropylene may be used as the outer exterior layers and a low melt temperature polyethylene may be used as the inner, thermal shutdown layer. U.S. Pat. Nos. 5,952,120, 5,691,077, and 8,486,556 and U.S. Patent Publication Nos. 2014/0079980, and 2008/0118827 disclose various methods for making multilayer microporous battery separator membranes.

Polypropylene, in some instances, may have a higher pin removal force or coefficient of friction than polyethylene that may result in pin design or pin removal issues during the production of certain cylindrical, jellyroll or prismatic type batteries or cells. In the manufacture of cylindrical and prismatic batteries, one important step in the battery cell preparation process may be the winding step where an "electrode/separator/electrode" stacked and layered assembly is wound around a central winding pin at a very high speed. When a separator membrane has a high pin removal force, a problem may occur in some instances where one or more layers of the electrode/separator/electrode layered assembly may be dislodged as the central winding pin is retracted and removed from the tightly wound up electrode/separator/electrode stacked assembly. One or more inner wraps of a battery separator membrane may dislodge or telescope out from the electrode/separator/electrode wound assembly as the winding pin is removed, which may, in some instances be caused by an unacceptably high level of pin removal force. A battery separator membrane, which may have an unacceptable level of pin removal force, may require pin redesign or may not allow for the economic production of uniform and perfectly wound cylindrical or prismatic battery cells.

There is a need for a microporous multilayer separator membrane that contains one or more polypropylene layer(s) and polyethylene layer(s) and that has good tensile and/or mechanical strength and that has low pin removal force that may enable high production yield rates in a battery cell winding process.

SUMMARY OF THE INVENTION

In accordance with at least selected embodiments, aspects or objects, the present application or invention may address the above needs, problems or issues, and/or may provide novel or improved porous membranes, microporous membranes, battery separator membranes, multilayer membranes, laminated membranes, laminated multilayer membranes, and/or separators, and/or batteries or devices including such membranes or separators, and/or methods of making such membranes, separators, devices, and/or batteries, and/or methods of using such membranes, separators, devices, and/or batteries. In accordance with at least certain embodiments, the present application is directed to a novel or improved microporous battery separator membranes, separators, batteries including such separators, methods of making such membranes, separators, and/or batteries, and/or methods of using such membranes, separators and/or batteries. In accordance with at least certain selected embodiments, the present invention is directed to a battery separator for a lithium battery that is a laminated multilayer microporous membrane having at least one polyethylene (PE) exterior layer or surface. In accordance with at least particular embodiments, the present invention is directed to a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer or multilayer configuration.

In accordance with at least certain embodiments, aspects or objects, the present application or invention may address the above needs, problems or issues, and/or may provide novel or improved microporous membranes, battery separator membranes, separators, batteries, cells or devices including such membranes or separators, methods of making such membranes, separators, devices, cells, and/or batteries, and/or methods of using such membranes, separators, devices, cells, and/or batteries. In accordance with at least selected embodiments, the present application is directed to a novel or improved microporous battery separator membranes, separators, batteries including such separators, methods of making such membranes, separators, and/or batteries, and/or methods of using such membranes, separators and/or batteries. In accordance with at least certain selected embodiments, the present invention is directed to a battery separator for a lithium battery that is a laminated multilayer microporous membrane having at least one polyethylene (PE) exterior layer or surface. In accordance with at least particular embodiments, the present invention is directed to a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer configuration.

In accordance with at least certain selected embodiments, aspects or objects, the present application or invention may address the above needs, problems or issues, and/or may provide novel or improved porous membranes, microporous membranes, battery separator membranes, multilayer membranes, laminated membranes, laminated multilayer membranes, and/or separators that contain one or more inner polypropylene layer(s) for good tensile and/or mechanical strength and two outer layers comprising polyethylene for low pin removal force that may enable high production yield rates in a battery cell winding process and/or that contain one or more polypropylene layer(s) and polyethylene layer(s) and that has good tensile and/or mechanical strength and that has low pin removal force that may enable high production yield rates in a battery cell winding process.

A microporous separator membrane having a low pin removal force may provide for optimal battery cell yields during the winding process step in the manufacture of lithium rechargeable batteries, such as lithium ion rechargeable batteries. Furthermore, the battery separator membrane described herein may have increased electrolyte absorption capacity and/or increased speed of electrolyte wetting at the separator/electrode interface region, both of which may improve cycling and/or performance of a given battery. Furthermore, the battery separator membrane described herein may have improved adhesion to any number of coatings, for example, a polymeric coating, a polymeric-inorganic particle blend coating, a polymeric-organic particle blend coating, or some other type of coating, which can be applied to the microporous separator membrane to enhance battery performance characteristics in a high rate performance rechargeable lithium battery. Furthermore, the battery separator membrane described herein may have a tunable thermal shutdown where the onset temperature of thermal shutdown may be raised or lowered and the rate of the thermal shutdown may be increased or decreased. In accordance with at least certain multilayer embodiments, the battery separator membrane described herein may have enhanced web handling performance during manufacturing processes and coating operations, which may allow wider widths of the battery separator membrane to be manufactured and coated. Wide width web handling capability may improve the economics of manufacturing and coating processes of the battery separator membrane described herein.

In accordance with at least selected embodiments, the present application is directed to a novel or improved microporous battery separator membrane, separators, batteries including such separators, methods of making such membranes, separators, and/or batteries, and/or methods of using such membranes, separators and/or batteries. In accordance with at least certain embodiments, the present invention is directed to a battery separator for a secondary or rechargeable lithium battery that is a preferably laminated multilayer polyolefin membrane with exterior layers comprising a polyethylene, a polyethylene blend, a polyethylene copolymer, or a mixture thereof, designed to provide the separator or membrane with an exterior surface that has a low pin removal force.

In accordance with at least certain embodiments, a microporous separator membrane having a low pin removal force may be required for optimal battery cell yields during the winding process step in the manufacture lithium rechargeable batteries, such as rechargeable lithium ion batteries. In accordance with selected embodiments, the present application or invention is a laminated multilayer polyolefin microporous membrane which may include low coefficient of friction exterior layers made of polyethylene (PE) or a blend of various polyethylenes, or one or more copolymers of PE, and one or more interior polypropylene (PP) layers and may be stacked in alternating layers, for example, but not limited to, a polyethylene/polypropylene/polyethylene (PE/PP/PE) layered configuration. In some instances, the use of outer PE layers in a multilayer separator membrane may provide a means to improve the economics of a manufacturing process in the manufacture of thermal shutdown, laminated multilayer polyolefin microporous separator membranes for rechargeable lithium batteries.

In the manufacture of cylindrical and prismatic batteries, the battery cell preparation process may include winding an "electrode/separator/electrode" stacked, layered assembly around a central winding pin at very high speeds. A short, leading length of the separator membrane may be initially wound around the winding pin at the start of the winding operation. As the winding operation continues, the layered electrode/separator/electrode assembly may be wound under tension at very high speeds to form a jellyroll or prismatic type battery cell. The winding pin may be retracted and removed after the cell has been completely wound. When a microporous membrane has a high pin removal force or a high coefficient of friction, a problem may occur as the central winding pin is retracted and removed from the tightly wound electrode/separator/electrode stacked assembly. Although batteries or cells are mentioned, other energy storage devices, packs, systems, cells, or the like (including accumulators, capacitors, battery/capacitor combinations, fuel cells, or the like) are contemplated. Further, such improved membranes may find use in other applications including filtration, absorption, separation, humidity control, garments, textiles, or the like.

It may be desirable that the uniformity of the tightly wound electrode/separator/electrode cell assembly not be disturbed as the winding pin is removed. However, some telescoping of an inner layer of the electrode/separator/electrode assembly may occur when a winding pin is removed if there is too high a coefficient of friction between the surface of a separator membrane and the surface of the winding pin. In some instances, too high a coefficient of friction may cause the electrode/separator/electrode layer to be slightly pulled out or dislodged when a winding pin is removed from the center of the wound cell assembly. In the case where an inner wrap or layer of the electrode/separator/electrode wound assembly may be dislodged, the battery cell may fail to qualify as a uniform, perfectly wound cylindrical or prismatic battery cell. In some instances, the battery cell manufacturer may discard such a battery cell which may lead to a loss in battery manufacturing yields.

The use of outer PE layers in a multilayer separator membrane or separator may provide a means to improve the economics of a battery cell winding process since, when the outer PE layers of a multilayer separator membrane are made of PE, there may be a sufficiently low coefficient of friction between the surface of a PE layer and the surface of the winding pin which may allow smooth retraction of the winding pin from the wound up battery cell assembly. Such provides a novel and/or improved method of improving a process of making a battery and/or an improved method of reducing the pin removal force occurring during a battery manufacturing process.

In some embodiments, the use of outer PE layers may enhance the electrolyte absorption capacity at the separator/electrode interface due to the relatively larger size of the pores in the PE porous layers (compared with the pore size of other materials, such as polypropylene, often used in the outer layers of multilayer battery separator membranes). It may be important for a battery separator membrane to act as a reservoir for electrolyte in a battery system; thus, the relatively larger pore size of the exterior PE layers of the separators described herein may advantageously lead to an increase in the amount of electrolyte present at the separator/electrode interface. Similarly, an increase in the speed of wetting with electrolyte for the separators described herein may occur as the pore size of the exterior PE layers of these separators may allow for quicker wetting with various types of electrolyte in a rechargeable lithium battery.

In additional embodiments, the use of outer PE layers may enhance the application of, the adhesion of, and/or the durability of various coatings applied to these separators, which enhanced coating ability and durability may lead to improved battery separator performance properties. The polyethylene used in the exterior layers of the separator membranes described herein may have a higher surface energy compared with other materials (such as, for example, certain types of polypropylene often used as an exterior layer on a multilayer separator), which lower surface energy can improve the adhesion of and durability of many types of coatings to the separator, including polymeric coatings, polymeric-inorganic particle blend coatings, polymeric-organic particle blend coatings, and so forth, which can be applied to the microporous separator membrane to enhance battery performance characteristics in a high rate performance rechargeable lithium ion battery.

In accordance with at least certain embodiments, the battery separator membrane described herein may have enhanced web handling performance during manufacturing processes and during coating operations and therefore may allow wider widths of the battery separator membrane to be manufactured and coated. Wide width web handling capability may improve the economics of the manufacturing process and the coating process of the battery separator membrane described herein.

Furthermore, the preferred laminated multilayer microporous separator membranes described herein are comprised of multiple layers of PE and PP manufactured as individual layers (starting as nonporous precursor layers), which nonporous precursor layers are laminated together in various configurations (such as, for example, alternating PE and PP configurations with PE layers at the exterior of the separator membrane and one or more PP layers in the interior of the separator membrane). The laminate is subsequently stretched to make the separator membrane porous, which serves as a method to minimize the chance of a defect in one or more of the PE or PP layers existing all the way through the film (which could be the case, for example, for a co-extruded membrane with exterior PE layers, which co-extruded membrane could have, in some instances, lower tortuosity, a higher chance of a defect extending through the film, a higher chance of a problem with strength, such as mixed penetration strength, and/or a higher chance of a problem with dielectric breakdown; and a co-extruded membrane comes out of the co-extrusion die at a much higher temperature than the temperature at which a laminated membrane is formed, which may affect final product features). Generally, the multilayer separator membranes described herein provide battery separators having myriad improvements relative to other known multilayer battery separators.

DETAILED DESCRIPTION OF THE INVENTION

Figure 1:
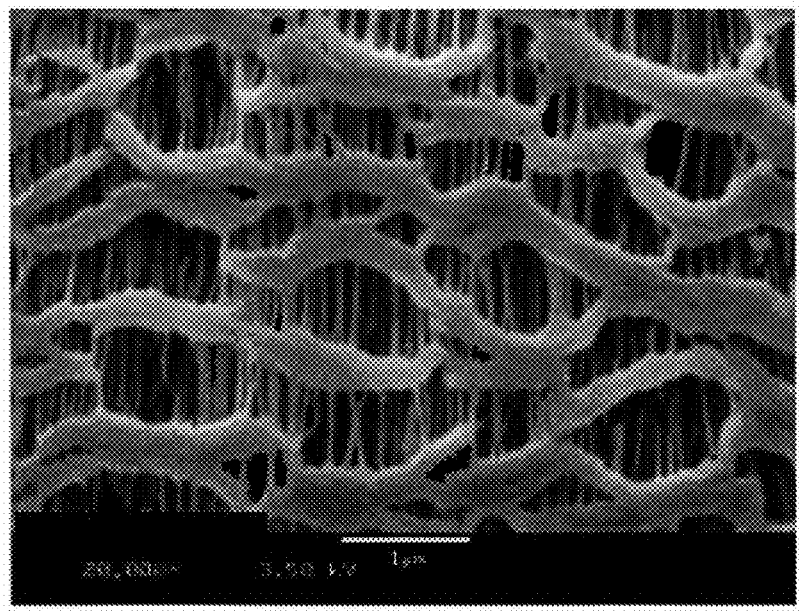
FIG. 1 is a Scanning Electron Micrograph (or SEM) image of the surface of inventive Example 1 at a magnification of 20,000×.

In accordance with at least selected embodiments, the present application or invention is directed to a novel or improved membrane, separator membrane, microporous battery separator membrane, separators, batteries or cells including such separators, methods of making such membranes, separators, cells, and/or batteries, and/or methods of using such membranes, separators, cells, and/or batteries. In accordance with at least certain embodiments, the present invention is directed to a battery separator for a secondary or rechargeable lithium battery which is a laminated multilayer polyolefin membrane with exterior layers or surfaces comprising a polyethylene, a polyethylene blend, a polyethylene copolymer, or a mixture thereof, designed to provide an exterior surface that has a low pin removal force, faster wetting, large pores, good coating adhesion, better shutdown, tunable shutdown, and/or the like. A microporous separator membrane having a low pin removal force may be required for optimal battery cell yields during the winding process step in the manufacture of rechargeable lithium batteries, such as rechargeable lithium ion batteries.

In the manufacture of cylindrical and prismatic batteries, the battery cell preparation process includes winding an "electrode/separator/electrode" stacked, layered assembly around a central winding pin at very high speeds. A short, leading length of the separator membrane is initially wound around the winding pin at the start of the winding operation. As the winding operation continues, the layered electrode/separator/electrode assembly is wound under tension at high speeds to form a jellyroll or prismatic type battery cell. The winding pin is retracted and removed after the cell has been completely wound. When a microporous membrane has a high pin removal force or has a high coefficient of friction, a problem can occur as the central winding pin is retracted and removed from the tightly wound up electrode/separator/electrode stacked assembly.

It may be desirable that the tightly uniformly wound electrode/separator/electrode cell assembly not be disturbed as the winding pin is removed. However, some telescoping of an inner portion of the electrode/separator/electrode assembly can occur when a winding pin is removed if there is too high a coefficient of friction between the surface of a separator membrane and the surface of the winding pin which may cause the electrode/separator/electrode layer to be slightly pulled out or dislodged at the center of the wound cell assembly. When the electrode/separator/electrode wound assembly is dislodged, the battery cell may fail to qualify as a uniform, perfectly wound cylindrical or prismatic battery cell and may be discarded by the battery cell manufacturer leading to a loss in battery manufacturing yields. A battery separator membrane which when stacked in an electrode/separator/electrode layered battery cell assembly dislodges or telescopes out from the electrode/separator/electrode wound assembly is said to have to high a pin removal force and may not allow for the production of cylindrical or prismatic battery cells which are considered uniform and perfectly wound.

A preferred stacked, multilayer configuration may include polyethylene and polypropylene where the outer layers of the multilayer separator comprise polyethylene and where one or more inner layers comprise polypropylene. In additional embodiments, so as not to limit the invention, polyethylene may also be included in one or more inner layers, and there may be more than one inner PP layer; thus, various configurations are contemplated herein. By way of example only, these configurations may include PE/PP/PE, PE/PP/PP/PE, PE/PP/PP/PE, PE/PE/PP/PE, PE/PP/PE/PE, PE/PE/PP/PE/PE, and so forth; these examples are by no means limiting.

Polyethylene may have a lower coefficient of friction as compared to polypropylene. Polypropylene can contribute to the mechanical strength of the overall separator while polyethylene can provide one or more low temperature thermal shutdown layers in the multilayer battery separator membrane. Since polyethylene may have a lower melt temperature than polypropylene, the pores in the microporous polyethylene layer may melt and close at a lower temperature than that of polypropylene. The polyethylene layer may provide a thermal shutdown mechanism to control thermal runaway in a lithium ion rechargeable battery and for this reason, may be a desirable safety feature to include in the design of a microporous multilayer battery separator membrane for a lithium ion rechargeable battery. Furthermore, the selection of a polyethylene (for example, a homopolymer of polyethylene having a certain density or crystallinity, such as a lower density or crystallinity) or a blend of various polyethylenes, or one or more copolymers of PE may provide a means to enable a tunable thermal shutdown by raising or lowering the onset temperature of thermal shutdown and varying the rate of thermal shutdown. Optimizing the number of layers of PP and PE (and therefore optimizing the amount of PP and PE and/or the thickness of the layers of PP and PE) may allow for the multilayer separators described herein to have optimal strength and optimal shutdown characteristics while at the same time having the various improvements previous mentioned, including lowered pin removal force, increased electrolyte absorption capacity and/or increased speed of electrolyte wetting, improved adhesion to coatings, and/or enhanced web handling performance.

A polyethylene membrane and a polypropylene membrane may have a different oxidation stability when placed against the cathode in a lithium ion rechargeable battery. A polypropylene microporous membrane is considered to be relatively inert, nonreactive and chemically stable when used as a separator membrane in a rechargeable lithium ion battery. When a lithium ion battery is fully charged, the positive electrode (cathode) may become a strong oxidizing active material, and the surface of the membrane at the "positive electrode/separator" membrane interface may be susceptible to degradation via oxidation. One possible remedy to this problem may be to use polypropylene as a monolayer separator membrane or to use a multilayer separator membrane with polypropylene as the outer membrane layer placed facing against the cathode.

However, a possible pin removal issue may be a concern when polypropylene is used as the outer layer in a multilayer battery separator membrane during the battery cell winding operation. Polypropylene can, in some instances, have a higher pin removal force and when used as the outer layer in a multilayer battery separator membrane in a battery cell assembly, one or more inner wrapped layers of the electrode/separator/electrode assembly may be dislodged or telescoped out from the electrode/separator/electrode wound assembly which can have an adverse effect on the production of cylindrical or prismatic battery cells which are uniform and perfectly wound. The use of polyethylene as the outer layers of the multilayer separator in the present application may improve pin removal due to the lower pin removal force of PE as compared to PP.

Polyethylene provides other advantages to the separators described herein when used as the outer layers in the multilayer battery separators described herein. PE may have excellent web handling characteristics as a flat sheet membrane, and this advantage may be appreciated in the web handling of wide widths of PE separator membranes. Dry process multilayer membrane made using an annular die may be manufactured in widths typically 30-36" wide. When PE is used as the outer layers in the multilayer membranes described herein, such a membrane may be easier to handle in terms of reduced wrinkling and creasing, enabling successful web handling of wider membrane widths, for example, widths wider than or even much wider than 36".

In at least some embodiments, additional advantages of using PE as the outer layers of the multilayer battery separator membranes described herein may be that the PE may enhance the speed of electrolyte wetting due to the higher surface energy of polyethylene and also due to the larger pore size of PE (both compared with that of PP). The surface energy of the PE microporous layer is 34 to 36 dyne/cm while that of the PP microporous layer is 30 to 32 dyne/cm. Faster, more complete wetting may occur if a polyolefin microporous substrate or membrane has a higher surface energy than the surface energy of the electrolyte. The electrolyte capacity within the larger pores of the PE layers and the electrolyte capacity at the separator/electrode interface may be increased when PE is used as the outer layers in a multilayer PE/PP/PE separator membrane. In some instances, a PP microporous layer may have a pore size range of anywhere from about 0.01 to about 0.1 um, while, in some instances, a PE microporous layer may have a relatively larger pore size, ranging from about 0.03 to about 0.15 µm. A larger pore size outer layer in a battery separator membrane may allow for faster wetting by an electrolyte and may facilitate the movement of lithium ions between electrodes during charge and discharge cycles of the battery. During the charge cycle of a lithium rechargeable battery, which may include a carbon based lithium host electrode and a lithium based active material electrode, lithium is extracted from the positive electrode in the form of lithium ions and these lithium ions migrate via the electrolyte medium through the pores of the separator membrane to intercalate into the negative electrode of the battery. The opposite occurs during discharge cycle where lithium ions move from the negative electrode to the positive electrode. With continuous charge and discharge cycling, a quicker electrolyte wetting membrane with larger pores may be preferred for high power battery performance. Furthermore, the increase in the electrolyte capacity within the larger pores of the PE layers and the increase in electrolyte capacity at the separator/electrode interface when PE is used as the outer layers in a multilayer separator membrane, may improve high power battery performance.

In at least certain embodiments, PE may have improved adhesion to various coatings, such as polymeric coatings, polymeric-inorganic particle blend coatings, and polymeric-organic particle blend coatings, when used as the outer layer in a multilayer battery separator membrane. Coatings may be applied to an outer PE microporous separator membrane layer as a means of alleviating the susceptibility of PE to oxidation when used as the outer layer in a multilayer separator membrane where the PE layer is placed facing the cathode. Polymeric, polymeric-inorganic particle blend, and polymeric-organic particle blend coatings can provide oxidation stability to the surface of the PE membrane. Furthermore, polymeric, polymeric-inorganic particle blend, and polymeric-organic particle blend coatings can provide high temperature performance and improved battery safety as well as higher rate of performance in various rechargeable lithium batteries, such as lithium ion batteries. In at least certain embodiments, the addition of PE or PE layers may increase compression, and/or increase resilience over prior multilayer separators.

In accordance with at least certain embodiments, the multilayer battery separator membrane described herein may have enhanced web handling performance during manufacturing processes and during coating operations and may allow wider widths of the battery separator membrane to be manufactured and coated. Multilayer membranes with outer PE layers may have less problems with creasing or folding during web handling. Wide width web handling capability may improve the economics of the manufacturing process and the coating process of the battery separator membrane described herein.

In accordance with at least certain embodiments, the multilayer battery separator membrane described herein may have reduced splittiness, enhanced TD strength, and/or increased tear resistance over prior multilayer separators.

EXAMPLES

In the following Table, separator membrane property data is listed for battery separator membranes produced using the foregoing described process. Table 1 lists separator property and performance data on Inventive Example 1, Example 2, Example 3 (all three PE/PP/PE trilayer separator membranes made according to the processes described herein) together with Comparative Example CE 1, and Comparative Example CE 2.

Example 1 is a $PE_1/PP_1/PE_1$ laminated trilayer membrane with a thickness of 14.1 µm that includes a homopolymer polyethylene type 1, which is designated as $PE_1$ and a homopolymer polypropylene type 1 which is designated as $PP_1$. All three of Examples 1-3 are made according to the following process: the laminated trilayer nonporous precursor (having the general PE/PP/PE format) was formed, and the precursor was annealed. Then, the laminated precursor was uniaxially stretched in the machine direction only. Subsequently, the porous membrane was heat set, de-plied, and slit. During the de-plying step, caution is taken to ensure that the outer PE layers of these membranes (where an outer PE layer of ply 1, for instance, is adjacent an outer PE layer of ply 2) are not damaged during de-plying and to ensure that the de-plying is successful.

FIG. 1 is a Scanning Electron Micrograph of the surface of the microporous separator membrane of Example 1 at a magnification of 20,000×.

Example 2 is a $PE_1/PP_2/PE_1$ laminated trilayer membrane with a thickness of 16.0 µm which includes $PE_1$ and a homopolymer polypropylene type 2, which is designated as $PP_2$. $PP_2$ has a higher molecular weight than $PP_1$. $PE_1$ is a higher density PE and has a density in the range of 0.935 to 0.970 and a melt flow index in the range of 0.05 to 2.0 g/10 min.

Figure 2:
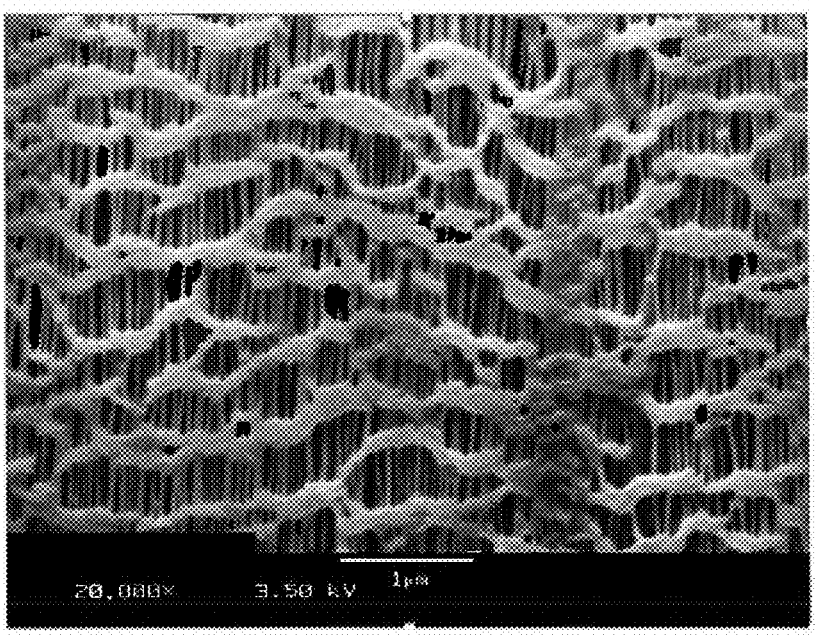
FIG. 2 is a Scanning Electron Micrograph image of the surface of inventive Example 3 at a magnification of 20,000×.

Example 3 is a $PE_2/PP_2/PE_2$ laminated trilayer membrane with a thickness of 14.0 µm where the polyethylene layers are made using a blend of two types of polyethylene, which blend is designated as $PE_2$. $PE_2$ is a blend of $PE_1$ and a second polyethylene, which is a lower density PE and has a density less than 0.940. $PE_1$ is a high density polyethylene (HDPE), and the second polyethylene is a linear low density polyethylene (LLDPE). FIG. 2 is an SEM image of the surface of the microporous separator membrane of Example 3 at a magnification of 20,000×. The pore size of the exterior PE layer (surface layer) shown in FIG. 2 for Example 3 is noticeably smaller than that of Example 1 shown in FIG. 1, which may demonstrate a smaller pore size of the outer layer(s) resulting from using a blend of two PEs, comprising both a HDPE and a LLDPE.

Example 4 is a polymer-ceramic coated $PE_1/PP_1/PE_1$ trilayer separator membrane where the uncoated base film is the same as in Example 1. Example 4 has a coated thickness of 19.4 µm.

Figure 3:
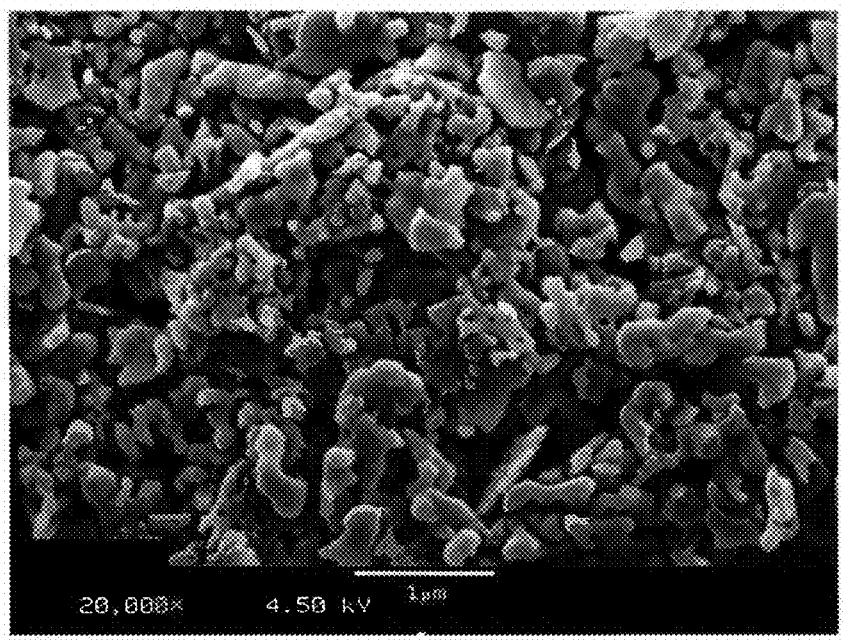
FIG. 3 is a Scanning Electron Micrograph image of the surface of inventive Example 5 at a magnification of 20,000×.
Figure 4:
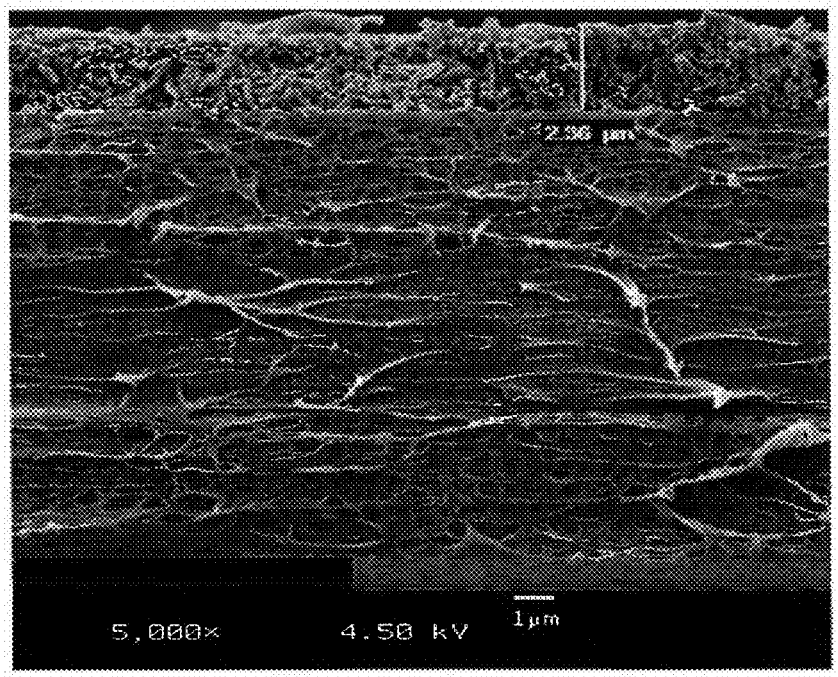
FIG. 4 is a Scanning Electron Micrograph image of the cross-sectional view of Example 5 at a magnification of 5,000×.
Figure 5:
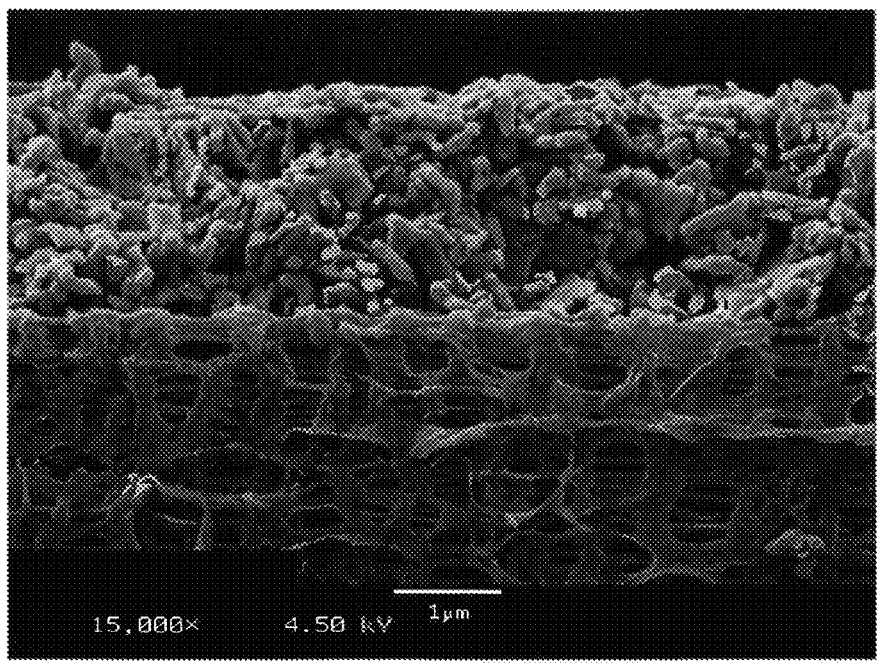
FIG. 5 is a Scanning Electron Micrograph image of another cross-sectional view of an outer coated PE layer of Example 5 at a magnification of 15,000×.

Example 5 is a polymer-ceramic coated $PE_1/PP_1/PE_1$ trilayer separator membrane where the uncoated base film is the same as in Example 1 and the polymer-ceramic coating materials is the same as that used in Example 4. For Example 5, the coated thickness is about 17 µm. FIG. 3 is an SEM image of the surface of Example 5 at a magnification of 20,000×. FIG. 4 is an SEM cross-sectional view of Example 5 at a magnification of 5,000× showing a polymeric-ceramic coating applied to the PE/PP/PE microporous membrane, at a measured thickness of about 2.36 µm. FIG. 5 shows a close-up of the SEM cross-sectional view of Example 5 at a magnification of 15,000× showing the polymeric-ceramic coating is closely adhered to the surface of the PE without any gaps or void spaces evident (which is advantageous relative to other coated membranes).

Comparative Example CE 1 is a PP/PE/PP laminated dry process trilayer microporous separator membrane with polypropylene as the outer layers sandwiching an inner polyethylene layer.

Comparative Example CE 2 is a PE/PP/PE co-extruded dry process trilayer microporous separator membrane.

Comparative Example CE 3 is a PP/PE/PP laminated dry process trilayer microporous separator membrane with polypropylene as the outer layers sandwiching an inner polyethylene layer, which trilayer separator membrane has been coated with a polyvinylpyrrolidone-aluminum oxide polymeric/ceramic coating.

A comparison of Example 1, Example 2, and Example 3, all of which are PE/PP/PE separator membranes according to the embodiments described herein, with Comparative Example CE 1 (a PP/PE/PP separator membrane) demonstrates that switching the two PP outer layers with PE in order to make two outer PE layers and making the inner a PP layer, may affect several important separator performance properties. Specifically, Example 1, Example 2, and Example 3, where PE comprises the outer two layers and the inner layer is PP, have 1) a lower Gurley, 2) a lower electrical resistance, and 3) increased machine direction (MD) tensile strength.

Furthermore, reviewing the Examples, Example 1, Example 2, and Example 3 have improved pin removal. In order to compare relative values of pin removal of various separator membranes, an arbitrary scale may be used where Comparative Example CE 1, where PP is the outer layers, is assigned a pin removal force value equal to zero percent (0%). A microporous separator membrane which has a negative value of pin removal force requires less force to remove a central winding pin from a wound up electrode/separator/electrode cell assembly. A microporous separator membrane which has a positive value of pin removal force requires more force to remove a central winding pin from a wound up electrode/separator/electrode cell assembly.

Various properties of the separator membranes are included in Table 1 below:

TABLE 1

|  | Ex. 1 | Ex. 2 | Ex. 3 | Ex. 4 | Ex. 5 | CE 1 | CE 2 | CE3 |
| --- | --- | --- | --- | --- | --- | --- | --- | --- |
| Configuration | $PE_1/PP_1/PE_1$ | $PE_1/PP_2/PE_1$ | $PE_2/PP_2/PE_2$ | $PE_1/PP_1/PE_1$ | $PE_1/PP_1/PE_1$ | $PP_3/PE_1/PP_3$ | PE/PP/PE | $PP_2/PE_1/PP_2$ |
| PE/PP/PE ratio | .33/.33/.33 | .33/.33/.33 | .33/.33/.33 | .33/.33/.33 | .33/.33/.33 | .33/.33/.33 | .29/.42/.29 | .33/.33/.33 |
| Laminated/Co-extruded | laminated | laminated | laminated | laminated + coated | laminated + coated | laminated | Co-extruded | laminated + coated |
| Thickness µm | 14.1 | 16.0 | 14.0 | 19.4 | 17 | 16.0 | 16.5 | 17 |
| Gurley JIS, s | 221 | 240 | 280 | 236 | 248 | 460 | 373 | 375 |
| % Porosity | 40 | 42 | 40 | 40 | 40 | 38 | 43 | 41 |
| ER ohm-cm$^2$ | 1.34 | 1.35 | 1.2 | 1.2 | 1.19 | 2.0 | 1.42 | 1.58 |
| MD Tensile kg/cm$^2$ | 2500 | 2400 | 2300 | 1923 | 2317 | 1900 | 1923 | 1802 |
| TD Tensile kg/cm$^2$ | 122 | 130 | 130 | 97 | 117 | 150 | 176 | 137 |
| MD % Elongation | 53 | 50 | 50 | 44 | 55 | 45 | 68 | 64 |
| TD % Elongation | 946 | 950 | 700 | 996 | 983 | 150 | 1031 | 228 |
| Puncture Strength, gf | 249 | 275 | 300 | 258 | 261 | 330 | 255 | 261 |
| Pore size - PP µm | 0.028 | 0.026 | 0.031 | 0.028 | 0.028 | 0.032 | 0.027 | 0.031 |
| Pore size - PE µm | 0.064 | 0.058 | 0.043 | 0.064 | 0.064 | 0.07 | 0.072 | 0.066 |
| Pin removal compared to CE 1 | −15% | −30% | −16% | na | −38% | 0% | na | 23% |
| Coating Adhesion | na | na | na | ≥20 N/m | ≥20 N/m | na | na | ≤10 N/m |

Example 1, Example 2 and Example 3 have negative values of pin removal force ranging from a −15% pin removal force to a −30% pin removal force, which may indicate that using PE as the outer layers in a trilayer battery separator membrane may reduce the possibility of a pin removal issue occurring during the winding step in the battery cell manufacturing process. A separator membrane which does not become dislodged when a winding pin is removed from the center of a wound up electrode/separator/electrode layered assembly may have a negative pin removal force. That is, the force required to remove the winding pin from the center of a wound up electrode/separator/electrode layered assembly is low enough that one or more layers of the electrode/separator/electrode are not disturbed and the electrode/separator/electrode layered assembly battery cell remains tightly and uniformly wound. A microporous separator membrane with a negative pin removal force is desirable in order to optimize battery cell yields during the winding process step in the manufacture of various batteries, such as a rechargeable lithium ion battery.

Example 5, which is a polymer-ceramic coated $PE_1/PP_1/PE_1$ trilayer separator membrane, has a negative pin removal force. The addition of the polymer-ceramic coating may help provide the negative pin removal force, which is desirable in order to optimize battery cell yields during the winding process step in the manufacture a lithium ion rechargeable battery. The coating also provides many other benefits to the coated separator. In at least certain embodiments, for example, exemplified in Example 4 and Example 5, the polymer-ceramic coating may provide oxidation resistance to the outer PE layer of the separator which faces the cathode in a lithium ion rechargeable battery. Improved oxidation resistance is desirable for longer cycle life in a lithium ion rechargeable battery.

In at least certain embodiments, the battery separator membrane described herein may have improved adhesion to various polymeric coatings, polymeric-organic particle blend coatings, or polymeric-inorganic particle blend coatings when one or more of such coatings is applied to a trilayer PE/PP/PE microporous separator membrane, for example, the membranes exemplified in Example 1, Example 2, and Example 3. The use of outer PE layers may enhance the application of, the adhesion of, and/or the durability of the coatings onto or on the battery separator membrane described herein, which coatings improve various performance properties of a multilayer PE/PP/PE separator membrane in batteries, such as rechargeable lithium ion batteries. The PE outer layer of a PE/PP/PE microporous battery separator membrane has a surface energy of 34-36 dyne/cm, whereas the PP outer layer in a PP/PE/PP microporous battery separator membrane has a lower surface energy of 30-32 dyne/cm. Higher surface energy of the outer layer in a multilayer microporous battery separator membrane promotes better adhesion to various polymeric, polymeric-organic particle blend, or polymeric-inorganic particle blend coatings. Example 4 and Example 5 were found to be easily wet by a coating slurry solution of the polymeric-inorganic ceramic particle blend, in this case, a coating slurry solution of polyvinylpyrrolidone (PVP) and alumina ($Al_2O_3$) ceramic particles. Such a coating, among other coatings, is described in U.S. Provisional Patent Application Nos. 62/097,199 filed Dec. 29, 2014, and 62/099,636 filed Jan. 5, 2015, and in U.S. patent application Ser. No. 14/982,466 filed Dec. 29, 2015, now U.S. Published Application No. 2016/0204409 published Jul. 14, 2016, each fully incorporated by reference herein in their entireties. In addition, Example 4 and Example 5 were found to have good adhesion to a polymeric-inorganic ceramic particle blend coating using a peel test. The coating adhesion of the polymeric-inorganic ceramic particle coating layer to the outer PE layer of the PE/PP/PE trilayer microporous separator membrane was found to be ≥20 N/m. The coating adhesion of the polymeric-inorganic ceramic particle blend coating on a PP/PE/PP trilayer microporous separator membrane having PP as the outer layer (in CE 3) was found to have a coating adhesion of less than 10 N/m. Thus, the coating adhesion values for the coated samples in Examples 4 and 5 were significantly greater relative to the coating adhesion value for the comparative example tested as CE 3. Examples 4 and 5 exhibited improved coating adhesion relative to comparative samples. Other ceramic coatings or ceramic coated separators are described in U.S. Pat. No. 6,432,586 issued Aug. 13, 2002 and in U.S. Published Application No. 2014/0045033 published Feb. 13, 2014, each fully incorporated by reference herein in their entireties.

Good adhesion of a ceramic-rich polymeric-inorganic ceramic particle blend coating may be required in order that the coating is durable and does not rub or fall off of the coated separator membrane during the rigors of a battery manufacturing process and/or remains durable during the life of the battery during repeated charge and discharge cycling.

Figure 6:
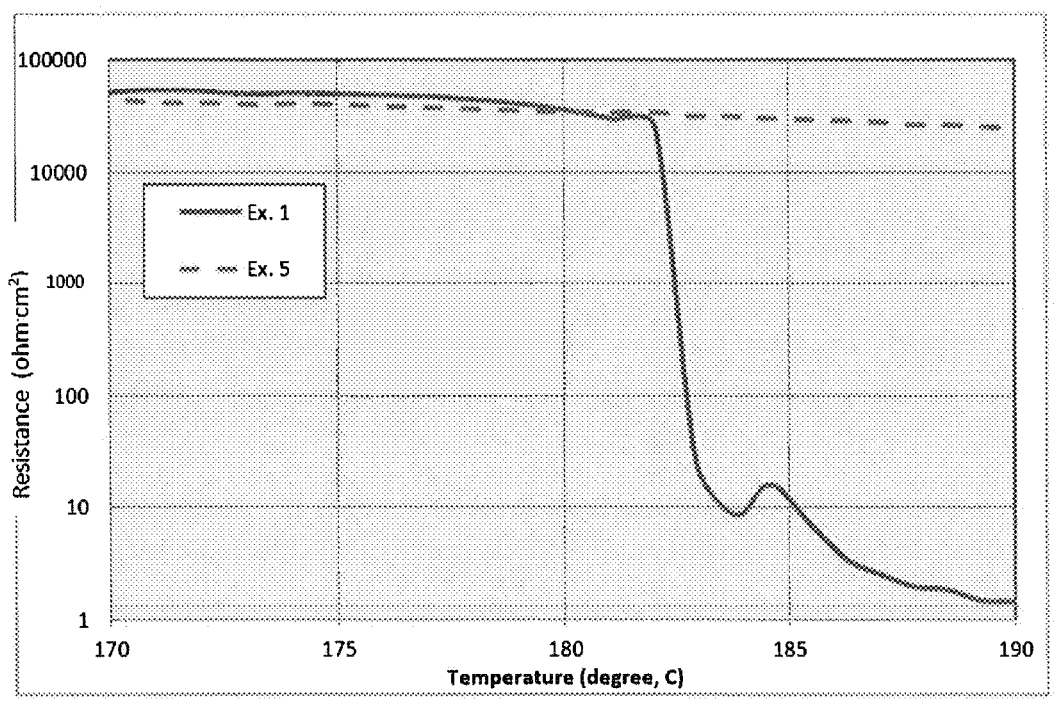
FIG. 6 is a Hot Electrical Resistance plot comparing sustained thermal shutdown of Example 1 and Example 5.

The battery separator membranes described herein as Examples 4 and 5, which are polymer-ceramic coated, have an extended thermal shutdown. FIG. 6 is a thermal shutdown plot (also referred to as a hot electrical resistance plot) of electrical resistance as a function of temperature for Example 1, an uncoated $PE_1/PP_1/PE_1$ membrane, and Example 5, a polymeric-ceramic coated membrane with the same base film or base membrane ($PE_1/PP_1/PE_1$). An extended thermal shutdown where the resistance greater than 10,000 ohm-cm' is sustained up to at least 190° C. is observed for the coated Example 5. Sustained thermal shutdown at temperatures up to, or above, 190° C. may be desirable for prolonged shutdown performance as a means to achieve improved safety for batteries, including rechargeable lithium ion batteries.

In certain embodiments, the battery separator membrane described herein may have a faster speed of wetting by various electrolytes, such as organic nonaqueous electrolytes (e.g., various alkyl carbonates and mixtures of alkyl carbonates, such as ethyl-methyl carbonates such as, but not limited to, EC, DMC, DEC, and EMC, where these electrolytes may be mixed with anion salts such as lithium hexafluorophosphate ($LiPF_6$)). The battery separator membrane described herein may have a PE pore size in the range of 0.03 to 0.15 μm, in some instances, 0.03 to 0.12 μm, in some instances, 0.03 to 0.08 μm, and in some instances, 0.03 to 0.07 μm, and sometimes in the range of 0.04 to 0.06 μm, which may improve the rate of electrolyte wetting. A faster speed of wetting of a microporous battery separator membrane by an electrolyte is preferred by battery manufacturers in order for efficient production speeds in the electrolyte filling step in battery cell manufacturing.

In certain embodiments, the battery separator membrane described herein may also provide a larger electrolyte reservoir for efficient movement of ions during charge and discharge cycles. For example, the use of two outer layers of PE in the PE/PP/PE trilayer configuration compared to using a single PE layer in the prior art PP/PE/PP configuration may improve electrolyte capacity. The pore sizes of the outer layers of PE may be larger than the pore sizes of an inner PP layer, and furthermore, the larger pore size PE layer is in direct contact with the electrodes. Larger PE pore sizes may hold a larger amount of electrolyte, which may improve lithium ion migration between the electrodes during cycling and improve the battery performance.

Example 3 demonstrates additional information about the potential importance of pore size for the PE layers and the PP layer(s) in the various inventive multilayer microporous separator membranes disclosed herein. The outer PE layers of Example 3 comprise a blend of HDPE and LLDPE. The PP layer has a slightly larger PP pore size of 0.031 μm (compared to a PP pore size of 0.028 μm in Example 1 and a PP pore size of 0.026 μm in Example 2), while the PE layers have a smaller PE pore size of 0.043 μm (compared to a PE pore size of 0.064 μm in Example 1 and a PE pore size of 0.058 μm in Example 2).

Figure 7:
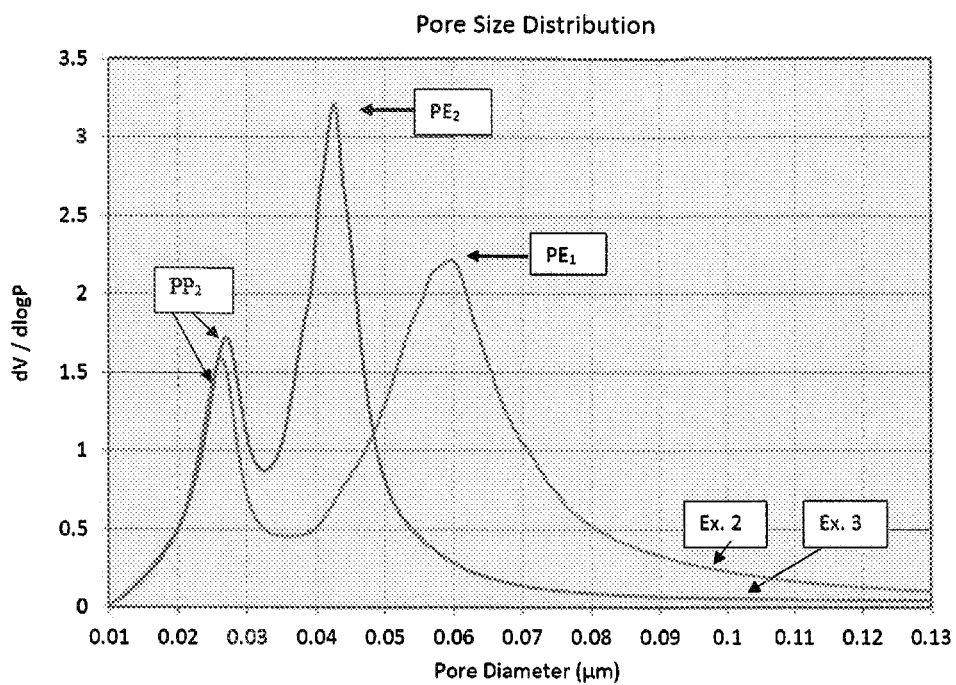
FIG. 7 is a pore size distribution plot of inventive Example 2 and Example 3.

FIG. 7 is a pore size distribution plot of Example 2 ($PE_1/PP_2/PE_1$) and Example 3 ($PE_2/PP_2/PE_2$) which differ by the type of PE in the outer layers. $PE_2$ in Example 3 is a blend of two PEs of different densities. The PE pore size peak is shifted to the left and is closer to the PP pore size peak. Shifting of the PE pore size slightly lower while shifting the PP pore size slightly higher may result in a membrane with a minimal increase in Gurley and improved puncture strength and ER (when comparing the results of Example 3 to the results of Example 2). The PE pore size may still be large enough to promote improved electrolyte absorption capacity and faster electrolyte wetting. However, a controlled decrease in PE pore size may lower the onset of thermal shutdown and/or improve the rate of thermal shutdown, while also providing a sufficient volume of PE for effective thermal shutdown. These improvements in thermal shutdown may be desirable in terms of advancing safety performance in various batteries, including rechargeable lithium ion batteries. Thus, choosing various blends of polyethylenes, as was done in Example 3, may lead to increased tenability of important properties of the separator so that separator performance is optimized.

The battery separator membranes described herein may have a range of thickness of the PE and PP layers. The ratio of PE/PP/PE thicknesses in a trilayer example may range from a thickness ratio of 5/90/5 up to a thickness ratio of 45/10/45 as a means to balance certain separator performance properties, namely, Gurley, electrical resistance, MD and TD tensile strength, MD and TD percent elongation, puncture strength, pore size, percent porosity (note that % porosity in Table 1 above is for the base film in coated Examples 4 and 5) and thermal shrinkage. In some embodiments, the inner PP layer(s) of the multilayer separators described herein may make up 40% or more of the total thickness of the separator, in some embodiments, 30% or more of the total thickness of the separator, in still other embodiments, 20% or more of the total thickness of the separator, to ensure desirable strength properties, such as good puncture strength. In some embodiments, each outer PE layer of the multilayer separators described herein may make up 10% or more of the total thickness of the separator, in some embodiments, 20% or more of the total thickness of the separator, and in still other embodiments, 30% or more of the total thickness of the separator, to ensure desirable properties such as good shutdown. The minimum thickness of individual PE layers can vary from 0.05 to 0.45 of the total thickness of the battery separator membrane described herein.

In at least some embodiments, an additional advantage of the battery separator membrane described herein is that using a particular material, such as a polyethylene having a certain crystallinity or density, for example, a lower or higher crystallinity or density, or a blend of polyethylenes of different densities or crystallinities in one or more of the polyethylene layers, or using one or more copolymers of PE, may provide a tool for a tunable thermal shutdown mechanism. Selection of the density of a polyethylene for one or more outer layers may change (e.g., lower or raise) the onset temperature of thermal shutdown and may change (e.g., increase) the rate of the thermal shutdown. Also, by using laminated PE and PP layers, each separate PE and PP layer may be formed at in an optimized manner for that particular polymer, blend or material. In at least certain co-extruded multilayer embodiments, each PE and PP layer may not be formed in an optimized manner for that particular polymer, blend or material. For example, a separate PP layer can be processed at a higher temperature than a PE layer to optimize the properties of the PP layer. Conversely, a separate PE layer can be processed at a lower temperature than a PP layer to optimize the properties of the PE layer.

Figure 8:
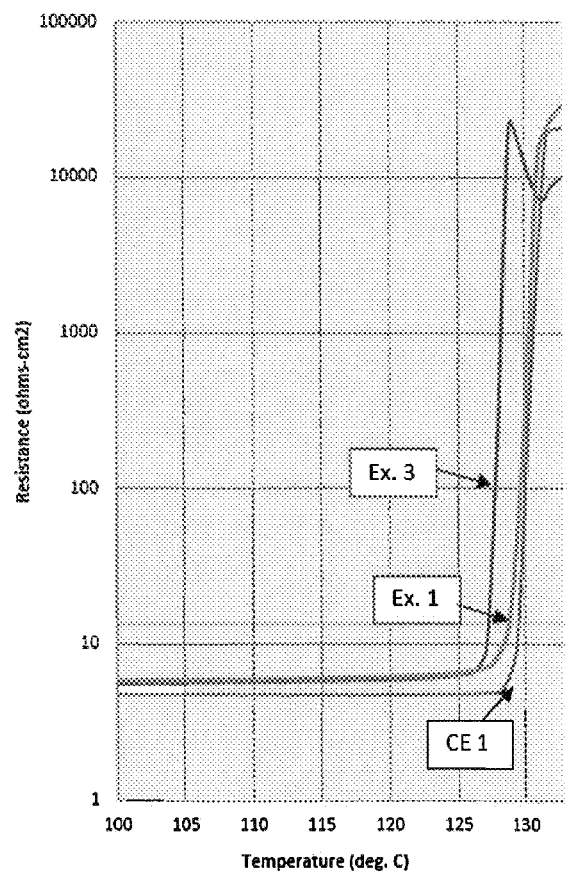
FIG. 8 is an Electrical Resistance plot comparing the onset of thermal shutdown for the various battery separators tested in Example 1, Example 3, and Comparative Example 1.

In FIG. 8, the onset temperatures of thermal shutdown for the separators formed as part of Example 1, Example 3, and Comparative Example 1 are shown. For the separator of Comparative Example 1, the onset temperature of thermal shutdown was close to about 130° C. For the separator of Example 1, whose outer PE layers comprise $PE_1$, an HDPE, the onset temperature of thermal shutdown was decreased compared to Comparative Example 1 and was measured to be in the range of 125-130° C. For the separator of Example 3, whose outer PE layers comprise $PE_2$, a blend of $PE_1$ (an HDPE) and an LLDPE, the onset temperature of thermal shutdown was further decreased below that of the separator of Example 1, to an even lower part of the temperature range between about 125 and 130° C. FIG. 8 illustrates that the use of different PEs (homopolymers, copolymers, blends, lower and/or higher density PEs, lower and/or higher crystallinity PEs, etc.) and the use of varying amounts or proportions of such PEs, in the outer PE layers of the separators described herein, can be used to tune, optimize, or change the onset temperature of thermal shutdown for the multilayer battery separators described herein. In addition, various separators described herein also provide for tuned or improved overall shutdown characteristics, including sustained thermal shutdown at high or higher temperatures.

Test Methods

Thickness:

Thickness is measured using the Emveco Microgage 210-A precision micrometer thickness tester according to test procedure ASTM D374. Thickness values are reported in units of micrometers, μm.

Gurley:

Gurley is defined as the Japanese Industrial Standard (JIS Gurley) JIS P8117 and is an air permeability test measured using the OHKEN permeability tester. JIS Gurley is the time in seconds required for 100 cc of air to pass through one square inch of film at constant pressure of 4.8 inches of water.

Puncture Strength:

Test samples are pre-conditioned to 73.4° C. and a relative humidity of 50% for a minimum of 20 minutes. An Instron Model 4442 is used to measure puncture strength of test sample. Thirty measurements are made across the diagonal direction of a 1¼"×40" continuous sample specimen and averaged. The puncturing needle has a 0.5 mm radius. The rate of descent of the puncturing needle is 25 mm/min. The film is held tight in a clamping device which utilizes an O-ring to securely hold the test sample in place. The diameter of this secured area is 25 mm. The displacement (in mm) of the film that was pierced by the puncturing needle is recorded against the resistance force (in gram force) developed by the tested film. The maximum resistance force is the puncture strength in units of gram force (gf). A load-versus-displacement plot is produced by this test method.

Pore Size:

Pore size is measured using the Aquapore Porsimeter available through Porous Materials, Inc. (PMI). Pore size is expressed in μm.

Porosity:

The porosity of a microporous film sample is measured using ASTM method D-2873 and is defined as the percent void spaces in a microporous membrane.

Tensile Strength:

The tensile strength along the machine direction (MD) and the transverse direction (TD) is measured using Instron Model 4201 according to ASTM D-882 method.

MD and TD % Elongation:

The MD % elongation or the % MD elongation at break is the percentage of extension in the machine direction of a test sample measured at the maximum tensile strength needed to break a sample. The TD % elongation or the % TD elongation at break is the percentage of extension in the transverse direction of a test sample measured at the maximum tensile strength needed to break a sample.

Electrical Resistance (ER):

Electrical Resistance is defined as the resistance value in ohm-cm' of a separator filled with electrolyte. The separator resistance is characterized by cutting small pieces of separators from the finished material and then placing them between two blocking electrodes. The separators are saturated with the battery electrolyte with 1.0 M $LiPF_6$ salt in EC/EMC solvent of 3:7 ratio by volume. The Resistance, R, in Ohms ($\Omega$), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ ($\Omega$), of the separator saturated with electrolyte is then calculated by the formula $R_s=p_s l/A$ where $p_s$ is the ionic resistivity of the separator in $\Omega$-cm, A is the electrode area in $cm^2$ and l is the thickness of the separator in cm. The ratio $p_s/A$=is the slope calculated for the variation of the separator resistance ($\Delta R$) with multiple layers ($\Delta\delta$) which is given by slope=$p_s/A=\Delta R/\Delta\delta$.

Hot Electrical Resistance (Hot ER):

Hot Electrical Resistance is a measure of resistance of a separator film while the temperature is linearly increased. The rise in resistance measured as impedance corresponds to a collapse in pore structure due to melting or "shutdown" of the separator membrane. The drop in resistance corresponds to opening of the separator due to coalescence of the polymer; this phenomenon is referred to as a loss in "melt integrity". When a separator membrane has sustained high level of electrical resistance, this is indicative that the separator membrane may prevent electrode shorting in a battery.

Pin Removal Force:

A test sample membrane is positioned on a battery winding pin and is wound around the central battery winding pin under tension. The force required to remove the battery winding pin from the center of the wound up sample is measured using a Chatillon tester. The pin removal force for each test sample is expressed as a percentage and is calculated by assigning the pin removal force of a control sample a value of 0% and expressing the pin removal force of the test sample as a % higher or % lower than the 0% pin removal of the control sample. For example, a test sample with a –25% pin removal force requires 25% less force to remove a battery winding pin from the core of a wound up test sample than the control sample. A negative pin removal force indicates a test sample has improved pin removal when compared to the control membrane sample.

Coating Adhesion:

Coating adhesion is assessed by pulling the coating layer away from the surface of a coated separator sample using a Chatillon CS225 tester. In various instances, the coating adhesion may be observed, and the force required to peel away the coating from the surface of the base separator substrate is greater than 10 N/m, sometimes ≥20 N/m.

Separator Wetting by Coating:

A drop of coating slurry is placed on the surface of a microporous membrane using an eye dropper, and the wetting of the membrane by the slurry is observed and recorded.

Separator Wetting by Electrolyte:

A drop of electrolyte is placed on the surface of a microporous membrane using an eye dropper, and the wetting of the membrane by the electrolyte is observed by the microporous separator membrane changing from an opaque white to a transparent, clear appearance.

Surface Energy:

The surface energy of a polyolefin microporous separator membrane can be measured by applying a drop of a standard Dyne test liquid having a known surface energy. This form of measurement is based on ISO8296 that describes the method for measuring the surface energy of polyethylene film. Units are expressed as dyne/cm.

In accordance with at least selected embodiments, aspects or objects, the present invention may be directed to or may provide: novel or improved membranes, separator membranes, microporous battery separator membranes, separators, batteries or cells including such separators, methods of making such membranes, separators, cells, and/or batteries, and/or methods of using such membranes, separators, cells, and/or batteries; laminated multilayer polyolefin membranes with exterior layers or surfaces comprising one or more polyethylenes, which exterior layers are designed to provide an exterior surface that has a low pin removal force; battery separator membranes having increased electrolyte absorption capacity at the separator/electrode interface region, which may improve cycling; battery separator membranes having improved adhesion to any number of coatings; coated battery separator membranes or separators; battery separator membranes having a tunable thermal shutdown where the onset temperature of thermal shutdown may be raised or lowered and/or the rate of thermal shutdown may be changed or increased; multilayer battery separator membranes having enhanced web handling performance during manufacturing processes and coating operations; and/or the like.

In accordance with at least selected embodiments, aspects or objects, the present invention may be directed to or may provide: novel or improved microporous membranes, battery separator membranes, separators, batteries or devices including such membranes or separators, methods of making such membranes, separators, devices, and/or batteries, and/or methods of using such membranes, separators, devices, and/or batteries; a novel or improved microporous battery separator membrane, separators, batteries including such separators, methods of making such membranes, separators, and/or batteries, and/or methods of using such membranes, separators and/or batteries; a battery separator for a lithium battery that is a laminated multilayer microporous membrane having at least one polyethylene (PE) exterior layer or surface; a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer configuration; microporous separator membranes having a low pin removal force may provide for optimal battery cell yields during the winding process step in the manufacture a lithium rechargeable batteries, such as lithium ion rechargeable batteries; battery separator membranes described herein may have increased electrolyte absorption capacity and/or increased speed of electrolyte wetting at the separator/electrode interface region, both of which may improve cycling and/or performance of a given battery; battery separator membranes described herein may have improved adhesion to any number of coatings, for example, a polymeric coating, a polymeric-inorganic particle blend coating, a polymeric-organic particle blend coating, or some other type of coating, which can be applied to the microporous separator membrane to enhance battery performance characteristics in a high rate performance rechargeable lithium battery; coated battery separator membranes or separators; battery separator membranes described herein may have a tunable thermal shutdown where the onset temperature of thermal shutdown may be raised or lowered and the rate of the thermal shutdown may be increased or decreased; multilayer battery separator membranes described herein may have enhanced web handling performance during manufacturing processes and coating operations, which may allow wider widths of the battery separator membrane to be manufactured and coated, such wide width web handling capability may improve the economics of manufacturing and coating processes of the battery separator membrane described herein; and/or the like.

In accordance with at least selected embodiments, aspects or objects, the present application or invention may address the above needs, problems or issues, and/or may provide novel, optimized or improved porous membranes, microporous membranes, battery separator membranes, multilayer membranes, laminated membranes, laminated multilayer membranes, and/or separators, and/or batteries or devices including such membranes or separators, and/or methods of making such membranes, separators, devices, and/or batteries, and/or methods of using such membranes, separators, devices, and/or batteries. In accordance with at least certain embodiments, the present application is directed to a novel or improved microporous battery separator membranes, separators, batteries including such separators, methods of making such membranes, separators, and/or batteries, and/or methods of using such membranes, separators and/or batteries. In accordance with at least certain selected embodiments, the present invention is directed to a battery separator for a lithium battery that is a laminated multilayer microporous membrane having at least one polyethylene (PE) exterior layer or surface. In accordance with at least particular embodiments, the present invention is directed to a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer or multilayer configuration, and/or the laminated multilayer configurations may include PE/PP/PE, PE/PP/PE/PP/PE, PE/PP/PP/PE, PE/PE/PP/PE, PE/PP/PE/PE, and/or PE/PE/PP/PE/PE.

In accordance with at least selected embodiments, aspects or objects, the present application or invention may address the above needs, problems or issues, and/or may provide novel, optimized or improved microporous polyolefin battery separator comprising:

a laminated microporous multilayer separator membrane comprising at least two outer layers, each of said outer layers comprising a polyethylene, a polyethylene blend, a polyethylene copolymer, or a mixture thereof, and an inner layer comprising a polypropylene, a polypropylene blend, a polypropylene copolymer, or a mixture thereof, and/or wherein the laminated microporous multilayer separator membrane has a polyethylene pore size in one or more outer layers of less than 0.06 µm, wherein the laminated microporous multilayer separator membrane has an onset temperature of thermal shutdown that is tunable and wherein the onset temperature of thermal shutdown is less than 135° C., wherein the laminated microporous multilayer separator membrane is a laminated trilayer membrane comprising three layers including a structure comprising polyethylene/polypropylene/polyethylene, wherein the trilayer membrane has a thickness ratio of polyethylene/polypropylene/polyethylene in a range of 5/90/5 to 45/10/45, wherein the separator has a pin removal force which is −15% and/or at least 15% less than the pin removal force of a known separator having a pin removal force of 0%, wherein the laminated microporous multilayer separator membrane has a polyethylene pore size in one or more outer layers in the range of 0.03 to 0.08 µm, and/or wherein the laminated microporous multilayer separator membrane has a polypropylene pore size in an inner layer in the range of 0.02 to 0.05 µm, and/or further comprising a coating comprising a polymer and particles selected from the group consisting of organic particles and inorganic particles, wherein said coating is applied to one or both outer polyethylene layers, and/or wherein the laminated microporous multilayer separator membrane has an adhesion to said coating of ≥20 N/m, and/or wherein said separator has a sustained thermal shutdown up to at least 190° C.; a method of making a microporous polyolefin battery separator comprising the steps of:

extruding at least two nonporous precursor polyethylene layers, each of said polyethylene layers comprising a polyethylene, a polyethylene blend, a polyethylene copolymer, or a mixture thereof, and extruding at least one nonporous precursor polypropylene layer, said polypropylene layer comprising a polypropylene, a polypropylene blend, a polypropylene copolymer, or a mixture thereof;

laminating two or more nonporous precursor polyethylene layers of polyethylene to one or more nonporous precursor polypropylene layer to form a nonporous laminated membrane precursor comprising outer layers of polyethylene and an inner layer of polypropylene, stacking two or more nonporous laminated membrane precursors;

annealing the stack of two or more nonporous laminated membrane precursors; and stretching the annealed stack of two or more nonporous laminated membrane precursors, wherein said stretching is uniaxial or biaxial, to form a laminated microporous multilayer separator membrane, and/or further comprising heat setting the laminated microporous multilayer separator membrane, and/or wherein said stretching is uniaxial in the machine direction, and/or further comprising providing a coating to one or more outer layers of said laminated microporous multilayer separator membrane, said coating comprising a polymer and particles, said particles selected from the group consisting of organic particles and inorganic particles, and/or wherein the laminated microporous multilayer separator membrane has an adhesion to said coating of ≥20 N/m; an improved separator, membrane, battery, method of making a separator, membrane, or battery, or method of using a separator, membrane, or battery according to the description herein; a microporous polyolefin battery separator comprising:

a microporous multilayer separator membrane comprising at least two outer layers, each of said outer layers comprising a polyethylene, a polyethylene blend, a polyethylene copolymer, or a mixture thereof, and an inner layer comprising a polypropylene, a polypropylene blend, a polypropylene copolymer, or a mixture thereof, and wherein said microporous multilayer separator membrane having a low pin removal force that may provide for optimal battery cell yields during the winding process step in the manufacture a lithium rechargeable batteries, such as lithium ion rechargeable batteries, that may have increased electrolyte absorption capacity and/or increased speed of electrolyte wetting at the separator/electrode interface region, both of which may improve cycling and/or performance of a given battery, that may have improved adhesion to any number of coatings, for example, a polymeric coating, a polymeric-inorganic particle blend coating, a polymeric-organic particle blend coating, or some other type of coating, which can be applied to the microporous separator membrane to enhance battery performance characteristics in a high rate performance rechargeable lithium battery, that may have a tunable thermal shutdown where the onset temperature of thermal shutdown may be raised or lowered and the rate of the thermal shutdown may be increased or decreased, and that may have enhanced web handling performance during manufacturing processes and coating operations, which may allow wider widths of the battery separator membrane to be manufactured and coated, such wide width web handling capability may improve the economics of manufacturing and coating processes of the battery separator membrane; novel or improved microporous membranes, battery separator membranes, separators, batteries, cells, or devices including such membranes or separators, methods of making such membranes, separators, devices, cells, and/or batteries, and/or methods of using such membranes, separators, devices, cells, and/or batteries; a novel or improved microporous battery separator membrane, separators, batteries including such separators, methods of making such membranes, separators, and/or batteries, and/or methods of using such membranes, separators and/or batteries; a battery separator for a lithium battery that is a laminated multilayer microporous membrane having at least one polyethylene (PE) exterior layer or surface; a battery separator for a secondary or rechargeable lithium battery that is a laminated multilayer porous polyolefin membrane with exterior layers comprising a polyethylene (PE), a polyethylene blend, a polyethylene copolymer, or mixtures thereof, designed to provide the separator or membrane with an exterior surface that preferably has a low pin removal force, and one or more polypropylene (PP) layers as one or more inner layers, where the PE and PP layers may be stacked as alternating PE and PP layers and laminated to form, for example, but not limited to, a polyethylene/polypropylene/polyethylene (PE/PP/PE) trilayer configuration; and/or the like as shown or described herein; novel or improved laminated multilayer microporous battery separator membranes, separators, batteries or cells including such separators, methods of making such membranes, separators, cells, and/or batteries, and/or methods of using such membranes, separators, cells, and/or batteries as shown or described herein.

Disclosed herein are novel or improved microporous battery separator membranes, separators, batteries including such separators, methods of making such membranes, separators, and/or batteries, and/or methods of using such membranes, separators and/or batteries. Further disclosed are laminated multilayer polyolefin membranes with exterior layers comprising one or more polyethylenes, which exterior layers are designed to provide an exterior surface that has a low pin removal force. Further disclosed are battery separator membranes having increased electrolyte absorption capacity at the separator/electrode interface region, which may improve cycling. Further disclosed are battery separator membranes having improved adhesion to any number of coatings. Also described are battery separator membranes having a tunable thermal shutdown where the onset temperature of thermal shutdown may be raised or lowered and the rate of thermal shutdown may be changed or increased. Also disclosed are multilayer battery separator membranes having enhanced web handling performance during manufacturing processes and coating operations.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

We claim:

1. A microporous polyolefin lithium battery separator comprising:
   a laminated, dry process, microporous multilayer separator membrane comprising at least two outer layers, at least one of said outer layers comprising a polyethylene, a polyethylene blend, a polyethylene copolymer, or a mixture thereof, and at least one inner layer comprising a polypropylene, a polypropylene blend, a polypropylene copolymer, or a mixture thereof;
   wherein the at least one inner layer has a pore size that is half of or less than half of a pore size of the at least one outer layer and the separator membrane has a JIS Gurley of 250 s or less;
   wherein the dry process consists of heating, extruding, annealing, and stretching.

2. The separator of claim 1, wherein the laminated microporous multilayer separator membrane has a polyethylene pore size in one or more outer layers of less than 0.06 µm.

3. The separator of claim 1, wherein the laminated microporous multilayer separator membrane has an onset temperature of thermal shutdown that is tunable and wherein the onset temperature of thermal shutdown is less than 135° C.

4. The separator of claim 1, wherein the laminated microporous multilayer separator membrane is a laminated trilayer membrane comprising three layers including a structure comprising polyethylene/polypropylene/polyethylene.

5. The separator of claim 4, wherein the trilayer membrane has a thickness ratio of polyethylene/polypropylene/polyethylene in a range of 5/90/5 to 45/10/45.

6. The separator of claim 1, wherein the separator has a pin removal force which is −15% and/or at least 15% less than the pin removal force of a known separator having a pin removal force of 0%.

7. The separator of claim 1, wherein the laminated microporous multilayer separator has a polyethylene pore size in at least one of the outer layers in the range of 0.03 to 0.08 microns.

8. The separator of claim 1, wherein the laminated microporous multilayer separator membrane has a polypropylene pore size in an inner layer in the range of 0.02 to 0.05 microns.

9. The separator of claim 1, further comprising a coating comprising a polymer and particles selected from the group consisting of organic particles and inorganic particles, wherein said coating is applied to one or both outer polyethylene layers.

10. The separator of claim 9, wherein the laminated microporous multilayer separator membrane has an adhesion to said coating of ≥20 N/m.

11. The separator of claim 9, wherein said separator has a sustained thermal shutdown up to at least 190° C.

12. The separator of claim 1, wherein the laminated microporous multilayer separator membrane having a configuration of PE/PP/PE, PE/PP/PE/PP/PE, PE/PP/PP/PE, PE/PE/PP/PE, PE/PP/PE/PE, and/or PE/PE/PP/PE/PE.

13. A lithium ion battery comprising the separator of claim 1.

14. A device comprising the battery of claim 13.

15. A method of making the microporous polyolefin lithium battery separator of claim 1 comprising the steps of:
 extruding at least one dry process nonporous precursor polyethylene layer comprising a polyethylene, a polyethylene blend, a polyethylene copolymer, or a mixture thereof;
 separately extruding at least one dry process nonporous precursor polypropylene layer, said polypropylene layer comprising a polypropylene, a polypropylene blend, a polypropylene copolymer, or a mixture thereof;
 laminating the at least one dry process nonporous precursor polyethylene layer to the at least one dry process nonporous precursor polypropylene layer to form a nonporous laminated membrane precursor comprising at least three layers (at least two outer layers and at least one inner layer), wherein at least one outer layer of the nonporous laminated membrane precursor comprises the at least one dry process nonporous precursor polyethylene layer, and at least one inner layer of the nonporous laminated membrane precursor comprises the at least one dry process nonporous precursor polypropylene layer,
 wherein the dry process nonporous precursor polypropylene layer is at least 10% of the total thickness of the nonporous laminated membrane precursor;
 annealing the nonporous laminated membrane precursor; and
 stretching the annealed nonporous laminated membrane precursor, wherein said stretching is uniaxial or biaxial, to form the laminated microporous dry process multilayer separator membrane wherein the at least one inner layer has a pore size one half or less than a pore size of the at least one outer layer and the separator membrane has a JIS Gurley of 250 s or less, said pore sizes following said stretching.

16. The method of claim 15, further comprising heat setting the laminated microporous multilayer separator membrane.

17. The method of claim 15, wherein said stretching is uniaxial in the machine direction.

18. The method of claim 15, further comprising providing a coating to one or more outer layers of said laminated microporous dry process multilayer separator membrane, said coating comprising a polymer and particles, said particles selected from the group consisting of organic particles and inorganic particles.

19. The method of claim 18, wherein the laminated microporous multilayer separator membrane has an adhesion to said coating of ≥20 N/m.

20. The method of claim 15, wherein the laminated microporous dry process multilayer separator membrane having a configuration of PE/PP/PE, PE/PP/PP, PE/PP/Coating, PE/PP/Other, PE/PP/PE/PP/PE, PE/PP/PP/PE, PE/PE/PP/PE, PE/PP/PE/PE, and/or PE/PE/PP/PE/PE.

* * * * *